UNITED STATES PATENT OFFICE.

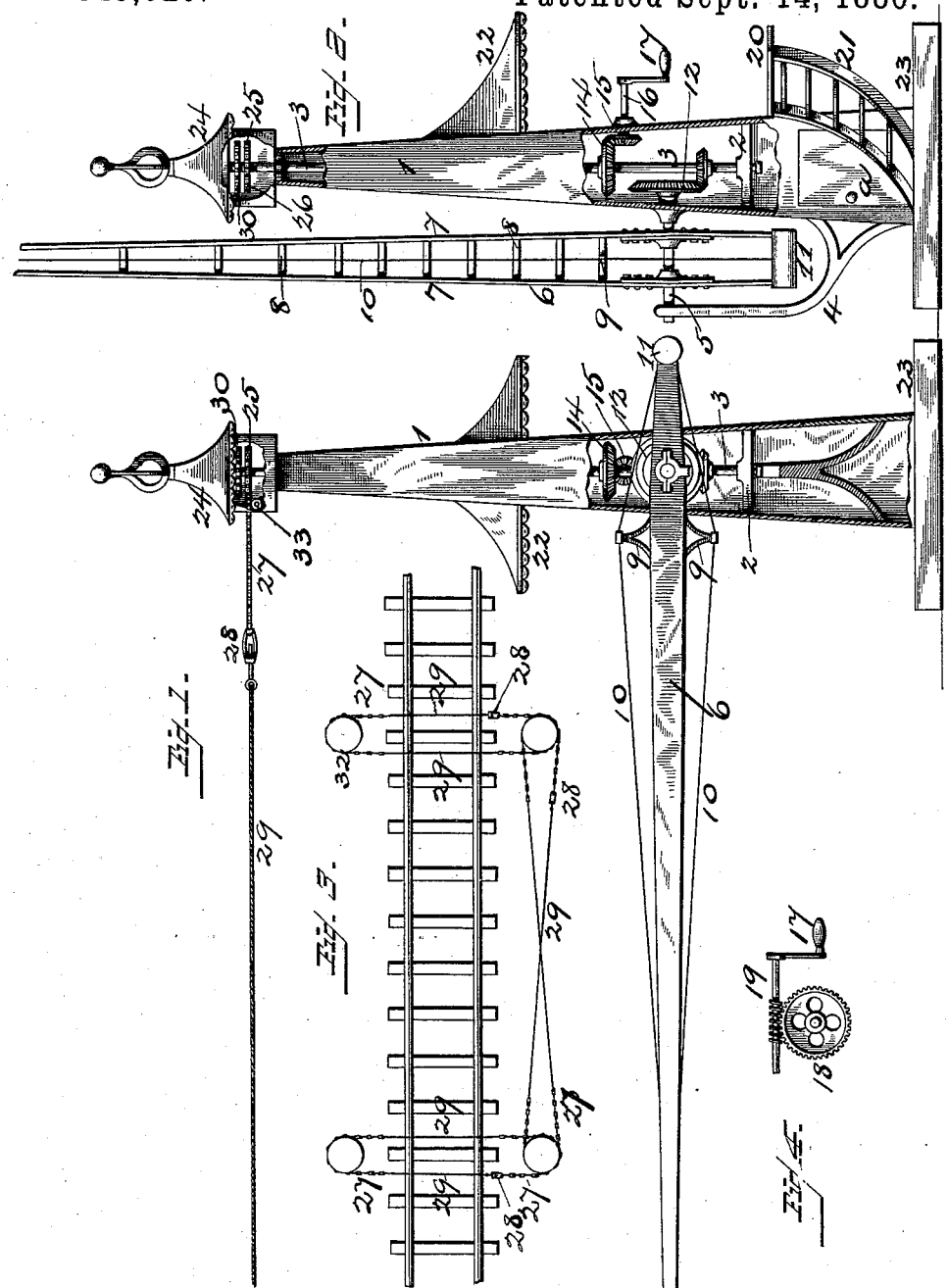

SYLVESTER J. WETMORE, OF LOWVILLE, NEW YORK.

RAILWAY-GATE.

SPECIFICATION forming part of Letters Patent No. 349,020, dated September 14, 1886.

Application filed April 30, 1886. Serial No. 200,708. (No model.)

*To all whom it may concern:*

Be it known that I, SYLVESTER J. WETMORE, a citizen of the United States, residing at Lowville, in the county of Lewis and State of New York, have invented certain new and useful Improvements in Railway-Gates; and I do hereby declare the following to be a full, clear, and exact description of the invention, such as will enable others skilled in the art to which it appertains to make and use the same.

This invention relates to certain improvements in that class of railway-gates employed at street-crossings and operated by hand. The gate or barrier consists of a series of beams having weighted rear ends and strengthening truss-rods, said beams being journaled at their rear portions upon transverse shafts, upon the inner ends of which are keyed beveled wheels, which mesh with bevel-pinions mounted upon vertical shafts, which are supported within hollow posts or towers having at their upper ends toothed wheels, with which are engaged a series of chains, or chains and wire ropes, connecting the several operating-shafts together, one of said operating-shafts having operative mechanism connected thereto, by actuating which said shaft is rotated, and such rotation, by means of the connecting-chains, transmitted to the similar shafts at the other points of the crossing and the series of beams raised and lowered, all as hereinafter described.

In the accompanying drawings, Figure 1 represents an end elevation, partly in section, of a gate constructed according to my improvements. Fig. 2 represents an end elevation, partly in section, of a portion of the gate, showing the operative mechanism. Fig. 3 represents, in top plan view, the method of connecting the several operative shafts. Fig. 4 represents a modified form of gearing for rotating the operating-shaft.

1 represents the towers or posts, which are hollow throughout their length and have doors *a* at their bottoms, to permit of the ready removal therefrom of snow, ice, dirt, &c., and thus prevent the freezing of snow and rain therein.

2 represents a bearing for the lower end of the operating-shaft 3.

4 represents brackets extending outwardly from the side of each tower, to support the outer ends of the transverse shafts 5, upon which the barriers 6 of the gate are mounted. The barriers are each formed of a pair of side plates, 7 7, each formed of any suitable material, as of wood, iron, &c., and either of one or more parts joined together, with a series of transverse interior bracing-strips, 8, an upper and a lower strut or bracket, 9 9, supporting barrier-supporting truss-rods 10, which are at their respective ends connected to the barrier, said struts or brackets being secured either to one of the transverse bracing-strips 8 or to the sides 7 of the barrier, and extending inwardly therefrom, so as to support the truss-rods in a central position, as may be desired.

11 represents the weighted rear ends of the barriers. The inner ends of the respective transverse shafts 5 extend to and through the adjacent sides of the hollow posts or towers 1, and have keyed thereon bevel-wheels 12, which mesh with similarly-beveled pinions keyed or otherwise securely attached to the vertical shafts 3.

14 represents a horizontal bevel-pinion fixed to the vertical shaft, and 15 a vertical bevel-pinion gearing therewith and attached to the inner end of the crank-shaft 16, which has its bearing within one side of the tower 1, and has on its outer end a suitable actuating handle, lever, or crank, 17. In lieu, however, of the bevel-pinions 14 and 15, I may employ a worm-wheel, 18, and a worm or screw shaft, 19, as represented in Fig. 4 of the drawings, the worm-wheel in such case being formed with a concaved and toothed edge, in the ordinary manner, as represented.

20 represents a platform, upon which the gate-tender stands while operating the gates, said platform being reached by steps 21, as represented in Fig. 2, and 22 represents a canopy for protecting the gate-tender from the weather. While, by placing the operating mechanism in a lower position than is represented in the drawings, said platform may be dispensed with, still the arrangement shown in the drawings is the more desirable one, as thereby the gate-tender can, by remaining upon the platform, the more readily view the track, and observe approaching trains and teams, and thus the more quickly close the gates on the approach of trains than would be possible were his position not so elevated.

23 represents the base or foundation supporting the hollow posts or towers 1. This base is formed hollow, and is filled with any suitable heavy anchoring material to steady it and the posts and parts connected therewith in position.

24 represents a cupola or canopy-top for shielding the interior of the hollow posts or columns 1 and the mechanism therein from rain, snow, &c.

25 represents a wheel or pulley mounted upon the upper portion of each of the vertical operating-shafts 3, said wheels or pulleys having circumferentially-extending teeth or outwardly-extending fingers 26, around which is passed a flat open-linked chain, 27, connected to one end of a turn-buckle, 28, to whose other end is attached one end of a wire cable or rope, 29, which extends to and connects with a similar chain, 27, passing around the toothed wheel on the vertical shaft at the other side of the roadway.

30 represents a toothed wheel similar to 25, which is also mounted upon the vertical operating-shaft, but in a position thereon above the wheel 25. Similar chain-and-cable connections connect this wheel 30 with a similar wheel, 32, correspondingly located upon the vertical barrier-operating shaft on the opposite side of the railroad-track.

The object of the turn-buckles is to provide for the taking up of any slack that there may be at any time in the cable-and-chain connections connecting the series of toothed wheels or pulleys on the vertical barrier-operating shafts, and keep the connections taut and in operative condition.

33 represents a sheave journaled in the hood 24, for the purpose of holding up the slack of the chain.

Of the hollow posts or towers 1 there is one at each of the four corners of a crossing. Each tower has a vertical shaft, 3, supported therein, and having at its lower portion the bevel-gear 13, bevel-wheel 12, and transverse shaft 5, to which the barrier is connected. On the upper end of each vertical shaft are mounted the toothed wheels 25 30, the series of which latter are connected together in mid-air by the chains 27 and cables 29. Consequently, when the crank-shaft 16 is rotated by the gate-tender and the vertical shaft in the tower at which he is stationed rotated so as, through the medium of the shaft 5, to either raise or lower the gates, a similar movement will, through the wheels 25 and 30 and their chain-and-cable connections, be imparted to the other three vertical shafts in the other three hollow posts, and said shafts on the other corners of the crossings will, through the medium of the gears 12 13, revolve the several transverse shafts 5, thus causing all the barriers constituting the gates to move in unison.

I am aware that it has been proposed to construct a railway-crossing gate with vertical posts at the crossings, gates or barriers pivoted to said posts, vertical shafts secured to said posts and gearing at their lower ends with quadrantal gears secured to the gates or barriers and connected together at their upper ends by an endless chain, and a pinion-shaft gearing with one of said quadrants, so as to raise the gate and quadrant adjacent to said pinion-shaft and cause the rotation of the several vertical shafts and the raising of the several gates or barriers. Such a construction and arrangement of parts, however, I do not claim; but,

Having thus described my invention, what I claim is—

1. A railway-crossing gate consisting of vertical hollow posts or towers at the crossings to be guarded, each having a shaft-bearing extending transversely across the interior thereof, a vertical shaft journaled upon said bearing within said posts and extending upwardly therein, operative gearing connected to one of said vertical shafts, horizontal shafts, each having suitable bearings on said posts and connected to the vertical shafts so as to be operated therewith, gate-beams secured to said horizontal shafts, a pair of toothed wheels mounted upon the upper end of each of said vertical shafts, and longitudinally and transversely extending cables, substantially as described, for connecting the series of toothed wheels on the upper ends of the vertical shafts, whereby the series of vertical shafts and the gate-beams connected thereto may be operated in unison, substantially as set forth.

2. A railway-crossing gate having a series of upright posts located at the intersections of the crossings, each having a shaft-bearing secured within and near the bottom thereof, a vertical shaft journaled in said bearing and within each post, toothed wheels mounted at suitable distances apart upon said shafts and near the lower ends thereof, an operating-crank journaled in the side of one of said posts, and having on its inner end a suitable gear to engage with the upper of said toothed wheels and rotate the same and the shaft to which it is connected, horizontal shafts having bearing in the sides of said posts, and each having a toothed wheel engaging with the lower of said toothed wheels on the vertical shafts, brackets extending outwardly from said posts, within which the outer ends of said horizontal shafts are journaled, barriers fixed upon said horizontal shafts, a pair of toothed wheels mounted upon the upper end of each of said vertical shafts, cables extending parallel with the track and engaging with one of the toothed wheels on the upper ends of and connecting each pair of vertical shafts, and cables extending transversely across the track, and each engaging one of the toothed wheels on and connecting a pair of the vertical shafts, all substantially as and for the purpose set forth.

3. A railway-crossing gate having a series of upright hollow posts or towers located at the intersections of the crossings, vertical rotatory shafts having bearings within said hollow posts, suitable gear secured to the lower portion of said shafts, barriers, horizontal shafts supporting said barriers and engaging the gear on the vertical shafts, a crank engaging said gearing on one of said vertical shafts, a pair of toothed wheels fixed to the upper end of each vertical shaft, one above the other, and independent cables, as described, each engaging two of said lower wheels, and similar independent cables, each engaging two of said upper wheels, substantially as and for the purpose set forth.

In testimony whereof I affix my signature in presence of two witnesses.

SYLVESTER J. WETMORE.

Witnesses:
 ELI L. JONES,
 H. P. CHAMBERS.